(12) United States Patent  
Rowe

(10) Patent No.: US 8,833,181 B1  
(45) Date of Patent: Sep. 16, 2014

(54) REVERSIBLE FORCE MEASURING DEVICE

(71) Applicant: Geoffrey Keith Rowe, Winter Springs, FL (US)

(72) Inventor: Geoffrey Keith Rowe, Winter Springs, FL (US)

( * ) Notice: Subject to any disclaimer, the term of this patent is extended or adjusted under 35 U.S.C. 154(b) by 0 days.

(21) Appl. No.: 14/019,185

(22) Filed: Sep. 5, 2013

(51) Int. Cl.
*G01L 1/02* (2006.01)
*G01L 1/04* (2006.01)

(52) U.S. Cl.
CPC ........................................ *G01L 1/04* (2013.01)
USPC .................................................... 73/862.581

(58) Field of Classification Search
USPC ....................... 73/760, 862.581, 865, 862.623
See application file for complete search history.

(56) References Cited

U.S. PATENT DOCUMENTS

| | | | | |
|---|---|---|---|---|
| 3,815,423 A | * | 6/1974 | Gearhart | ...................... 73/865.2 |
| 4,412,456 A | * | 11/1983 | Wilhelm et al. | ......... 73/862.541 |
| 4,489,799 A | * | 12/1984 | Menon | .......................... 177/209 |
| 7,171,851 B2 | * | 2/2007 | Kamata | ...................... 73/152.59 |
| 2008/0106873 A1 | * | 5/2008 | Okuya | .......................... 361/748 |

* cited by examiner

*Primary Examiner* — Max Noori

(57) ABSTRACT

A reversible force measuring device that can comprise at least one cavity, at least one load receiving area, and at least one indicating material; wherein the indicating material moves in or out of the at least one cavity as its volume changes to indicate the magnitude and/or direction of the applied loads. A reversible force measuring device that can comprise at least one cavity, at least one load receiving area, and at least one indicating material; a fastener causes the indicating material to move in and out of the at least one cavity to indicate the magnitude and/or direction of the applied loads. A reversible force measuring device comprising at least two independent cavities, at least one load receiving area, and at least one indicating material; wherein the difference in volume changes indicates the force as the indicating material moves in or out of the at least two cavities.

30 Claims, 16 Drawing Sheets

REVERSIBLE FORCE MEASURING DEVICE

FIELD

The present invention relates to a reversible force measuring device for fastener components and load cells components that measures static and dynamic forces such as tension, compression, torque, and shear through the reversible volumetric changes of the cavities in the measuring device.

SUMMARY OF THE INVENTION

The present invention discloses a reversible force measuring device that can comprise at least one cavity, wherein when load is applied to the device it causes a reversible volumetric change to the at least one cavity which causes an indicating material to move in or out of the at least one cavity to indicate the magnitude and/or direction of the applied loads.

The reversible volumetric change refers to the ability of the at least one cavity to reverse its change in volume when the forces are reversed and when the load is removed the cavity returns to its original shape. This application refers to a force measuring device that can continuously measure the changes in the forces. For example, as the load increases or decreases ten percent, the force measuring device can indicate this 10 percent change.

In one embodiment, the reversible force measuring device can comprise at least one cavity, at least one cavity wall, at least one load receiving area, at least one of a fastener component or a load cell component, and at least one indicating material; wherein the at least one cavity is a space defined by the at least one cavity wall, wherein applying force to the at least one load receiving area in the at least one of a fastener component or a load cell component induces the Poisson effect on the at least one cavity wall, wherein the Poisson effect causes the reversible volumetric change of the at least one cavity, and wherein the reversible volumetric change of the at least one cavity causes the at least one indicating material to move in or out of the at least one cavity to indicate the magnitude and/or direction of the applied loads.

In this embodiment, the reversible force measuring device can further comprise at least one indicator duct, at least one indicator hole, at least one indicator channel, and at least one channel cover or tube; wherein the at least one indicator duct is connected with the at least one cavity, wherein the at least one channel cover or tube is made of transparent or semi-transparent material, and covers and seals the at least one indicator channel, wherein the at least one indicating material moves from the at least one cavity into the indicator duct, through the at least one indicator hole, and into the at least one indicator channel or tube when force is applied to the at least one load receiving area.

In another embodiment, the reversible force measuring device can comprise at least one cavity, at least one flexible cavity wall, at least one fixed cavity wall, at least one of a fastener component or a load cell component, and at least one indicating material; wherein the at least one cavity is the space between the at least one flexible cavity wall and the at least one fixed cavity wall, wherein the at least one fixed cavity wall is part of a fixed medium or adjacent to a fixed medium, wherein the at least one of a fastener component or a load cell component causes a volumetric change of the at least one cavity by moving the at least one flexible cavity wall, and wherein the reversible volumetric change of the at least one cavity causes the at least one indicating material to move in or out of the at least one cavity to indicate the magnitude and/or direction of the force applied by the fastener.

In this embodiment, the reversible force measuring device can further comprise at least one indicator hole, at least one indicator tube; wherein the at least one indicating material moves in and out from the at least one cavity into the at least one indicator tube through the at least one indicator hole when the at least one cavity changes in volume.

In another embodiment, the reversible force measuring device can comprise at least two independent cavities, at least one load receiving area, at least one of a fastener component or a load cell component, and at least one indicating material; wherein the applied load to the at least one of a fastener component or a load cell component induces reversible volumetric changes in each of the at least two independent cavities.

In this embodiment, the reversible force measuring device, wherein each of the at least two cavities can further comprise at least one indicator hole, at least one indicator channel, and at least one channel cover or tube wherein the at least one indicator channel cover or tube is made of transparent or semi-transparent material, and covers and seals the at least one indicator channel, wherein the at least one indicating material moves in or out from each of the at least two independent cavities, through the at least one indicator hole, and into the at least one indicator channel when force is applied to the at least one load receiving area.

In addition to the aspects and advantages as described in this summary, further aspects and advantages will become apparent by reference to the drawings and by reading the detailed description that follows.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1:
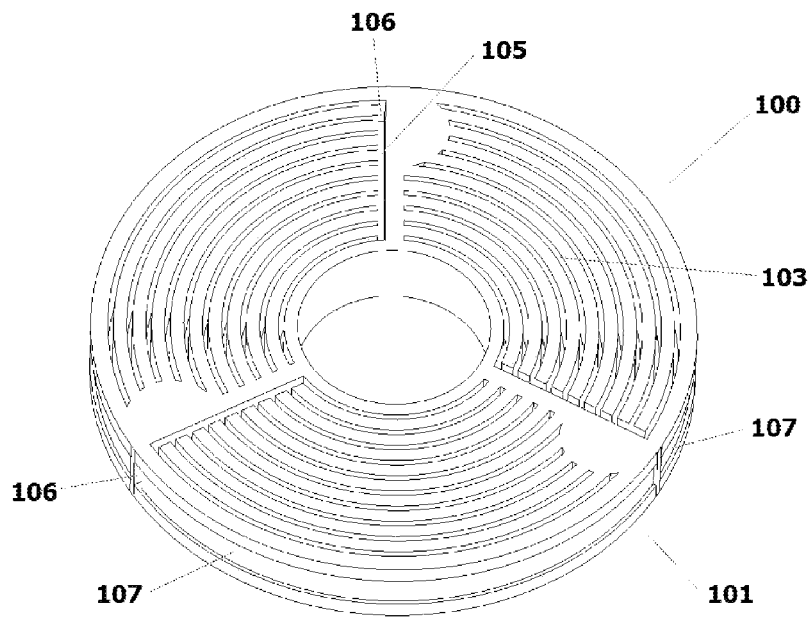
FIG. 1 is a perspective view of an embodiment of the force measuring device wherein the device is in a circular shape comprising at least one cavity.

In the following detailed description, reference is made to the accompanying drawings that form a part hereof, and in which is shown by way of illustration specific implementations that may be practiced. These implementations are described in sufficient detail to enable those skilled in the art to practice the implementations, and it is to be understood that other implementations may be utilized and that logical, mechanical, electrical and other changes may be made without departing from the scope of the implementation. The following detailed description is, therefore, not to be taken in a limiting sense.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The present invention discloses a reversible force measuring device that can comprise at least one cavity, wherein when load is applied to the device it causes a reversible volumetric change to the at least one cavity which causes an indicating material to move in or out of the at least one cavity to indicate the magnitude and/or direction of the applied loads. The reversible volumetric change refers to the ability of the at least one cavity to reverse its change in volume when the forces are reversed and when the load is removed the cavity returns to its original shape. This application refers to a force measuring device that can continuously measure the changes in the forces. For example, as the load increases or decreases ten percent, the force measuring device can indicate this 10 percent change.

FIG. 1 is a perspective view of an embodiment of the reversible force measuring device 100 wherein the device is in circular shape and can comprise at least one cavity 103, at least one load receiving area 101 (backside), and at least one indicating material 102 (not shown in FIG. 1); wherein the volume of the at least one cavity changes when force is applied to the at least one load receiving area, wherein the indicating material 102 moves in or out of the at least one cavity 103 as its volume changes to indicate the magnitude and/or direction of the applied loads. The at least one load receiving area 101 can be on either surface or both surfaces of the force measuring device 100. The applied force can be simultaneously applied to both top and bottom surfaces.

Figure 2:
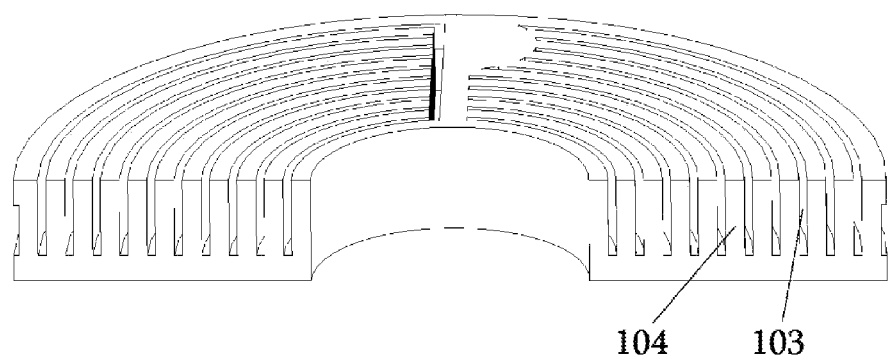
FIG. 2 is a section view of the circular shaped device.

FIG. 2 is a section view of the circular shaped force measuring device 100. As shown in FIG. 2, there is at least one cavity 103 between the cavity walls 104. In this embodiment the cavity walls 104 are Compression-Poisson columns arranged as concentric columns. The cavity walls 104 are closely spaced to minimize the volumes of the cavities 103 and to therefore maximize the strength of the force measuring device 100. As more cavities 103 and cavity walls are fitted into the circular shape force measuring device 100, the ratio between the height and width of each cavity wall gets greater which increases the sensitivity of the device 100 by allowing more Poisson motion (avoids more of the constrained Poisson) which increases the change in cavity volume for the same load.

Figure 3:
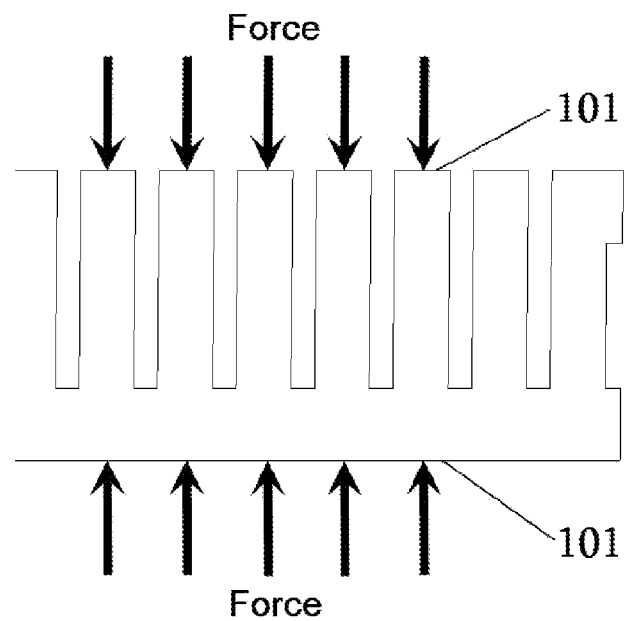
FIG. 3 is an illustration of how compression load is applied to the device.

FIG. 3 is an illustration of how compression load is applied to the force measuring device 100. Compression load can be applied to one or more load receiving areas 101 on the force measuring device 100. In the embodiment shown in figure, compression load can be applied from both the top and bottom of the force measuring device 100.

Figure 4:
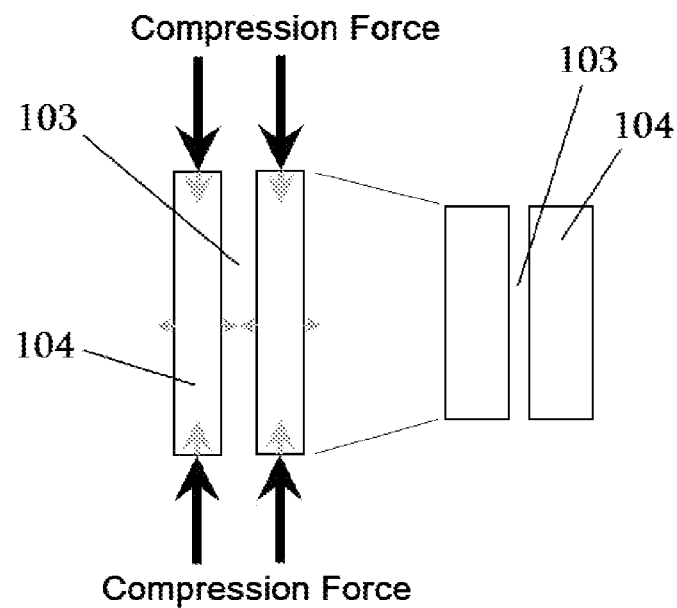
FIG. 4 is an illustration of how a compression load causes the cavity to change volume.

FIG. 4 is an illustration of how compression load causes the at least one cavity 103 to change volume. As load is received by the at least one load receiving area 101, the force is then transferred to the at least one cavity wall 104. The at least one cavity wall 104 is made of at least one Compression-Poisson column that changes shape according to the Poisson effect induced by the applied load. In this figure, the directions of the forces applied are shown by the largest arrows on the top and bottom. The smaller arrows indicate the changes in the Compression-Poisson columns heights and widths. As shown, the at least one cavity wall 104 becomes shorter in height due to compression load and wider due to the Poisson strain. As a result, the at least one cavity 103 decreases in volume as the spaces between the at least one cavity wall 104 are taken by the expansion of the at least one cavity wall 104 in the lateral direction. Consequently, a certain amount of the at least one indicating material 102 is squeezed out from the at least one cavity 103. A different compression load will result in a different Poison effect induced in the cavity wall 104 hence a different volume change in the cavity 103. Therefore, the amount of indicating material 102 being squeezed out from the cavity is an indication of the amount of compression load being applied to the load receiving area 101. By observing the amount of the at least one indicating material 102 being squeezed out from the at least one cavity 103, the force applied to the device 100 can thus be calculated.

Figure 5:
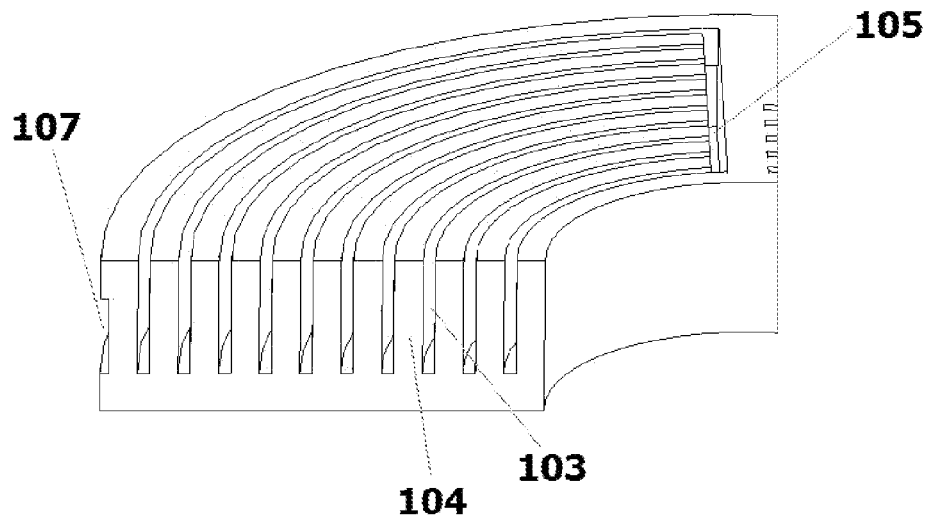
FIG. 5 is a perspective view of the interior of the device, wherein the device is made of multiple cavities.
Figure 6:
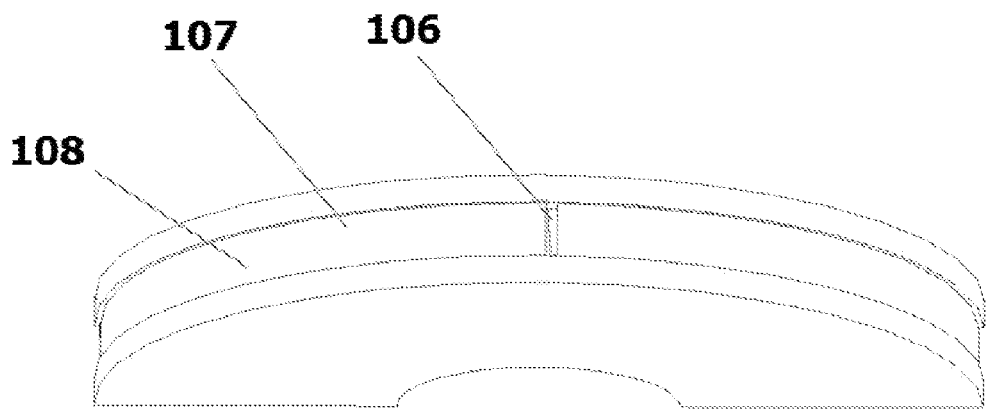
FIG. 6 is a perspective view of the indicator channel of the device with the cover removed.

FIG. 5 and FIG. 6 are perspective views of the internal structure of one embodiment of the force measuring device 100. In this embodiment, the force measuring device 100 has a mechanism by which the indicating material 102 squeezed out from the at least one cavity 103 can be conveniently observed. In this embodiment, the force measuring device 100 can further comprise at least one indicator duct 105, at least one indicator hole 106, at least one indicator channel 107, and at least one channel cover, wherein the location 108 of the at least one channel cover is shown but not the cover itself. In an embodiment which has multiple cavities 103, at least one indicator duct 105 is needed to connect the cavities 103 together. The indicator duct 105 serves as a common channel for the indicating material 102 to travel from all cavities 103 in the device 100 to the outside of the device 100. The indicator duct 105 will also serve as a common channel for the indicating material 102 to travel back into the cavities 103. At least one indicator hole 106 is needed for the indicating material 102 to exit the interior of the force measuring device 100. In this embodiment, an indicator hole 106 is disposed on the exterior surface of the device 100. One end of the indicator duct 105 is connected to the indicator hole 106. In this embodiment, the indicator hole 106 is connected to an indicator channel 107 on the exterior surface, wherein the at least one channel cover 108 (the location for the cover is shown, but not the cover itself), made of transparent or semi-transparent material, covers and seals the at least one indicator channel 107. The transparent or semi-transparent cover allows an observer to observe the amount of indicator material 102 being squeezed out from the device 100 due to compression load.

Figure 7:
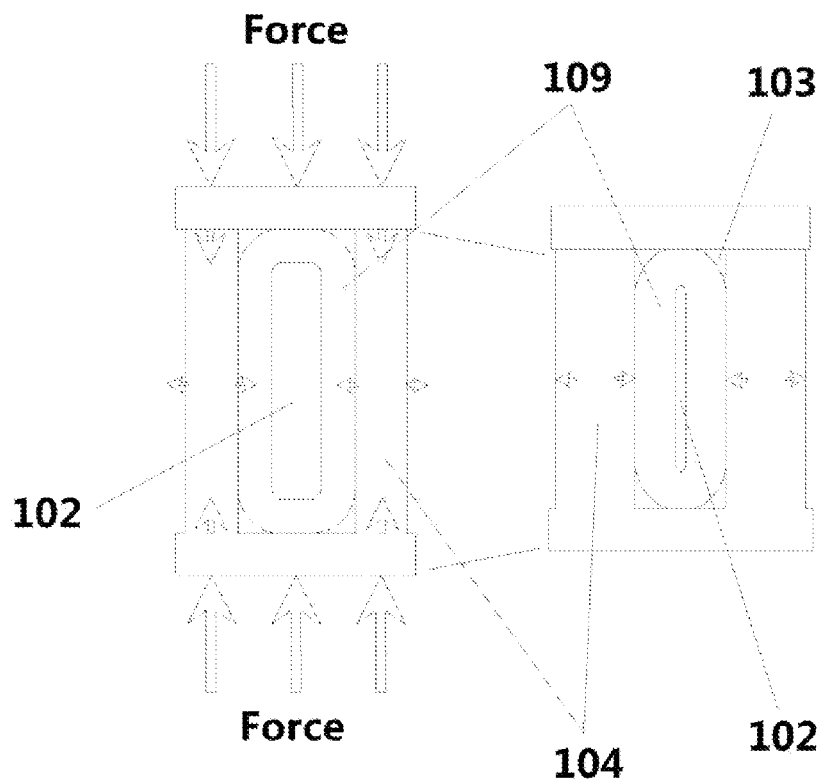
FIG. 7 is an embodiment of the device wherein the cavity further comprises a tube filled with a resilient material such as a fluid.

FIG. 7 demonstrates an embodiment of the device 100 wherein the at least one cavity 103 can further comprise a tube 109. In this embodiment, the at least one cavity 103 is designed to make room for a tube 109 made of resilient materials to be inserted into the at least one cavity 103. The tube 109 will seal the at least one indicating material 102. As the cavity 103 decreases or increases in volume, tube 109 will be squeezed more or less causing the inside volume 102 of the tube 109 to shrink or expand with the cavity 103 thus the indicating material 102 inside the tube will move in or out of the tube 109.

Figure 8:
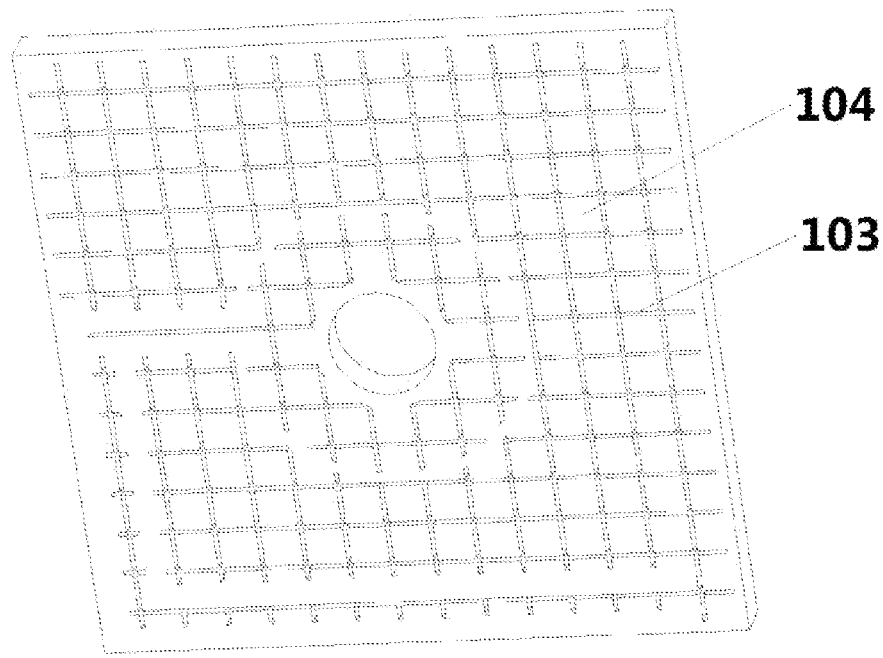
FIG. 8 is an embodiment of the device wherein the device is in rectangular shape.
Figure 9:
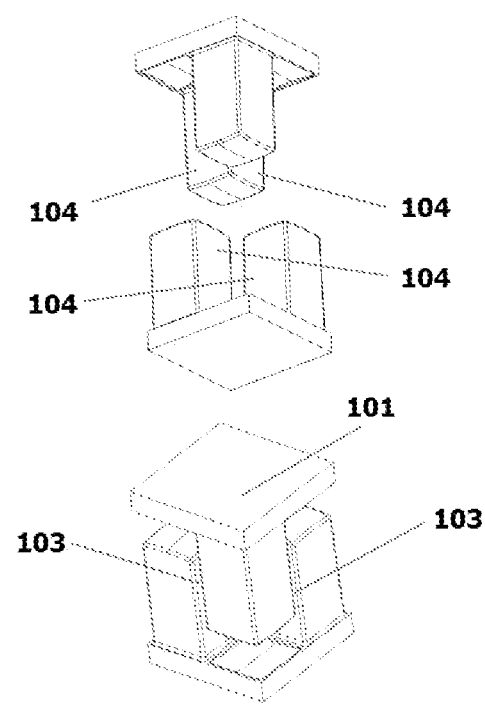
FIG. 9 is a small portion of another embodiment of the device wherein this small portion is made up of two sections each with two Compression-Poisson columns.

FIG. 8 and FIG. 9 illustrates two more embodiments of the device wherein the device 100 is in a rectangular shape and the at least one cavity 103 is constructed by square columns 104. FIG. 8 illustrates an embodiment where the columns 104 are square and have the at least one cavity 103 in between these square columns. FIG. 9 illustrates another embodiment where the Compression-Poisson columns are interleaved between the two parts and form all the Compression-Poisson columns as the parts are assembled together. FIG. 9 illustrates an exploded view of a small portion of this embodiment of the device wherein the device 100 is constructed with an upper and lower section that fit into one another. This figure illustrates only a small section of the final device 100. Each section shown has two Compression-Poisson columns, often referred to as cavity walls 104, such that when the top and bottom sections are assembled together the result is four Compression-Poisson columns 104 where the at least one cavity 103 is formed by the spaces between these columns and their surrounding additional sections not shown.

FIG. 8 and FIG. 9 embodiments have the advantage of lowering the constrained Poisson surfaces in two dimensions. In the embodiment shown in FIG. 1, the Poison change of the cavity wall 104 is only in one direction. In FIG. 8 and FIG. 9 embodiments, the Poison change of the cavity walls 104 can occur in both x and y directions. This will allow an increase in the change in the volume of the cavities 103 for the same applied force therefore making the force measurement device 100 more accurate.

Figure 10:
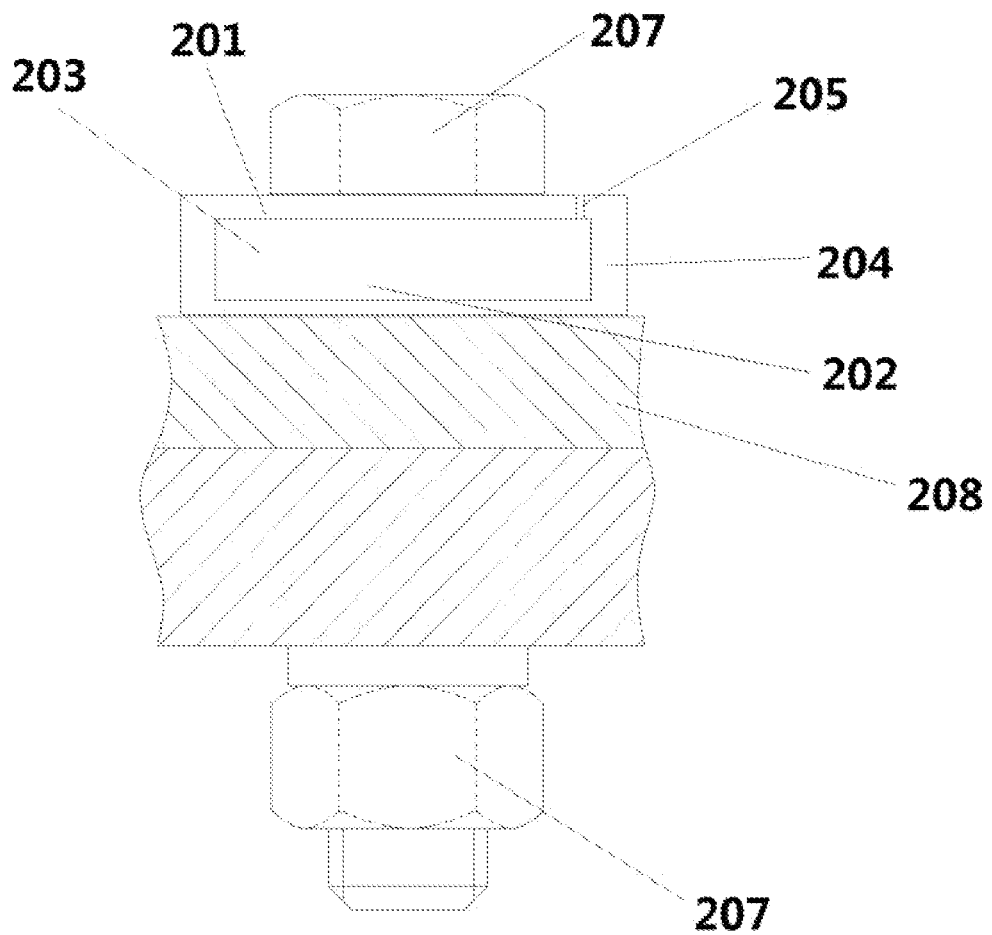
FIG. 10 is an embodiment of the device wherein the load is applied to the cavity through a bolt head.
Figure 11:
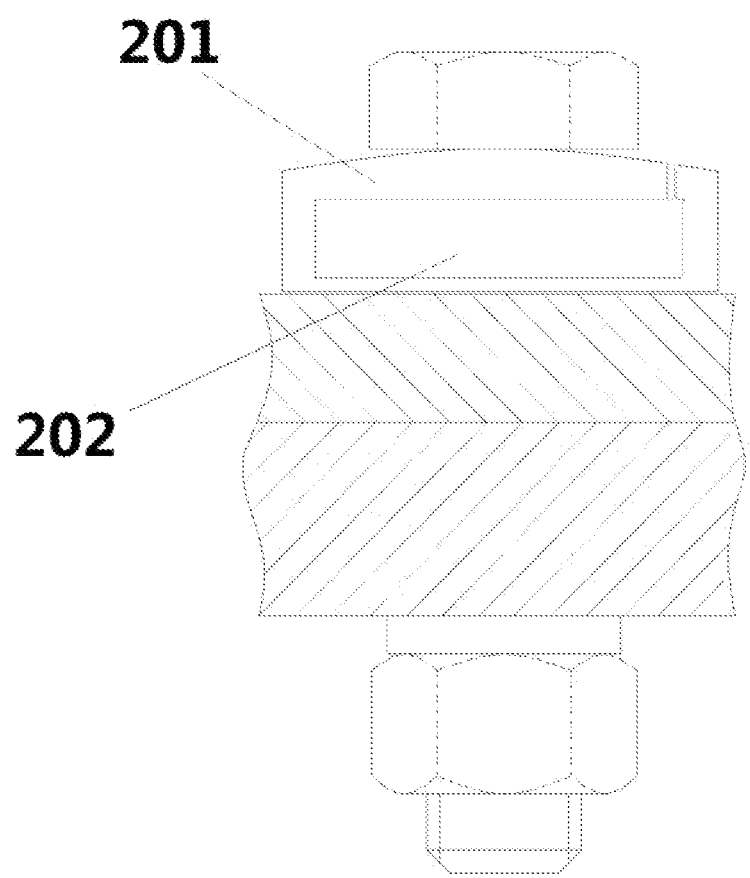
FIG. 11 is another embodiment of the device wherein the cavity wall on the top of the cavity is shaped differently to improve certain characteristics.

FIG. 10 and FIG. 11 illustrate two more embodiments of the device 100 that are very similar wherein the force measuring device 100 can comprise at least one cavity 203, at least one load receiving area 201, and at least one indicating material 202. The at least one load receiving 201 area can be deformed by the movement of a fastener 207. The fastener 207 can be a bolt head, nut, stud, rivet, etc. The fastener 207 shown in these figures is a bolt head. The deformation of the at least one load receiving area 201 causes a change in the volume of the at least one cavity 203. The change in volume of the at least one cavity 203 causes the indicating material 202 to move in and out of the at least one cavity 203 to indicate the magnitude and/or direction of the applied loads. FIG. 11's at least one load receiving area is shaped differently than FIG. 10's at least one load receiving area to increase the sensitivity.

In FIG. 10 and FIG. 11 embodiments, the device 100 is more sensitive than embodiments shown in FIGS. 1 through 9 and can be used for measuring much lower loads. In these embodiments the device 100 does not use compression strain or Poisson strain as the main deformation for changing the volume of a cavity 203. The bending of the upper surface of the cavity wall 204 is utilized to lower the volume in the cavity 203 and squeeze the at least one indicating material 202 out of an indicator hole 205 from the at least one cavity 203. Similar to the previous embodiment, the device 100 in this embodiment can further comprise an indicator hole 205, and an indicator tube 206 (shown in FIG. 14), wherein the indicating material 202 moves in and out from the at least one cavity 203 into the indicator tube 206 through the indicator hole 205 when the at least one cavity 203 changes in volume.

Figure 12:
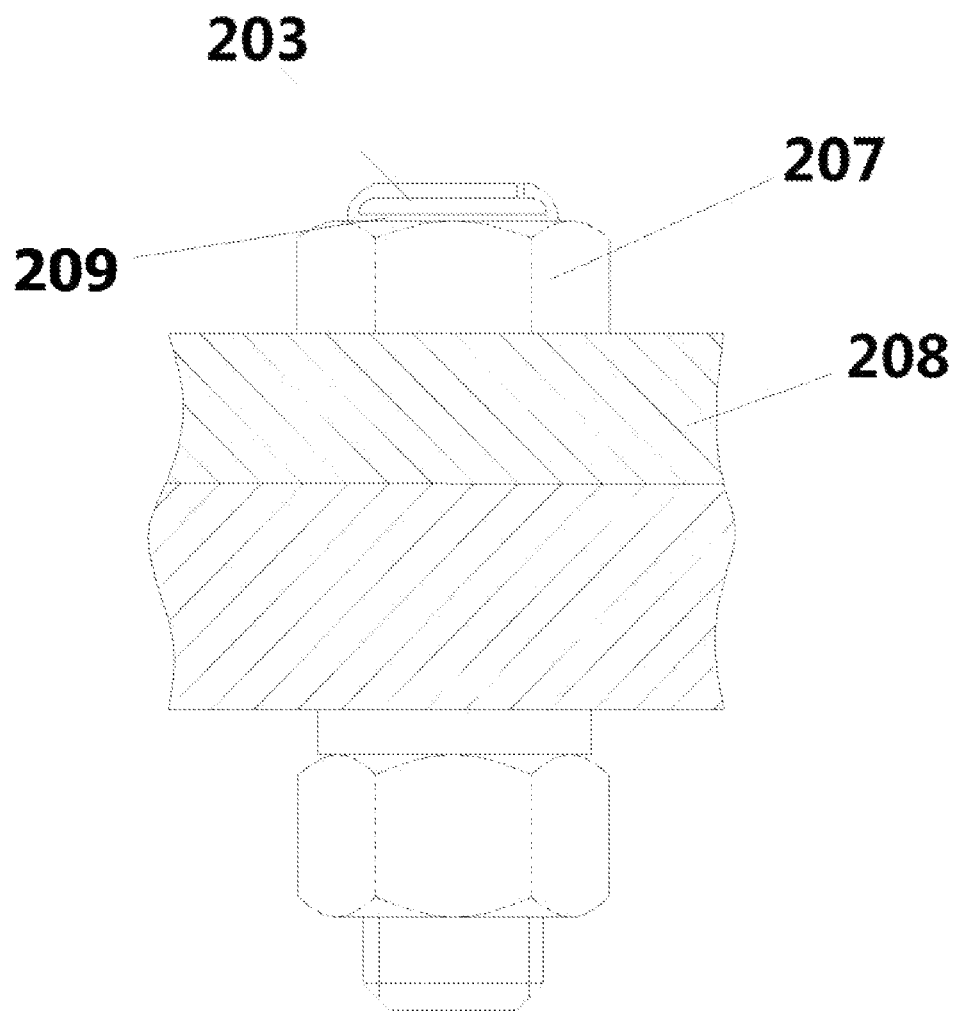
FIG. 12 is another embodiment of the device wherein the cavity is placed above the bolt head.
Figure 14:
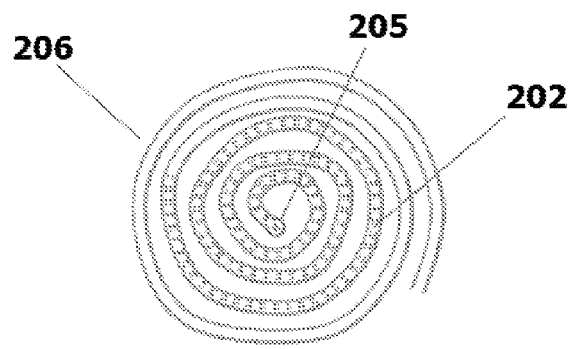
FIG. 14 is an embodiment of the indicating tube wherein the indicating fluid moves in the tube to indicate the change in volume of the cavity.

FIG. 12 is another embodiment of the device wherein the cavity 203 is on top of the fastener 207 which clamps materials 208 together. When the fastener 207 is tightened, the center section of the top of the head of the bolt moves down which moves the flexible cavity wall 209 of the at least one cavity 203 downward with the bolt head. This downward movement increases the volume of the at least one cavity 203 which draws indicating material 202 (shown in FIG. 14) from an external indicating tube 206 (not shown here but is shown in FIG. 14). The upper section of the at least one cavity 203 is fixed and does not move as the fastener 207 is tensioned. The flexible cavity wall 209 of the cavity 203 can also be the top of the bolt head instead of a separate layer 209 as shown in FIG. 12.

Figure 13:
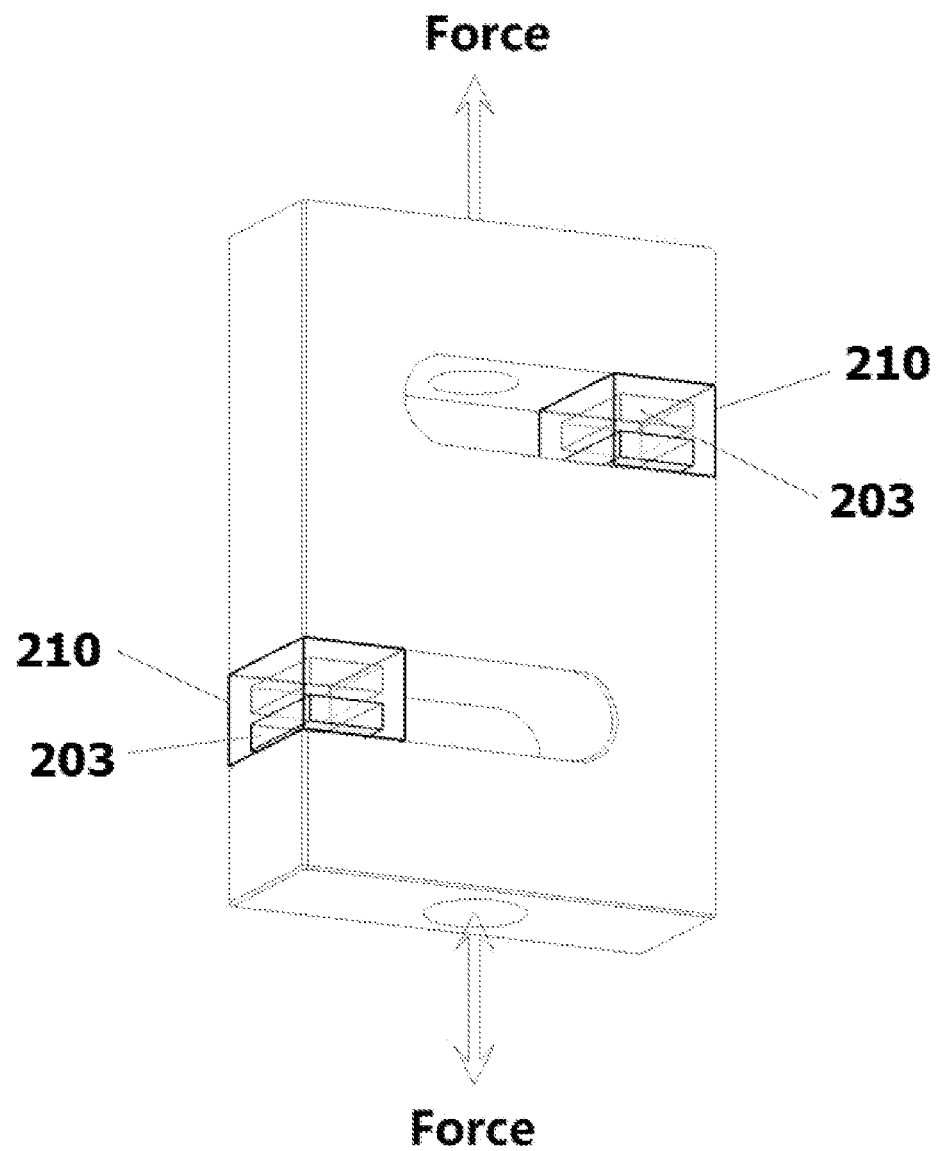
FIG. 13 is another embodiment of the device wherein the cavity is in a load cell, wherein the change in volume of the cavity is caused by a compression or tension applied to the load cell.

FIG. 13 is another embodiment of the device wherein the at least one cavity 203 is positioned in a load cell as shown in the cavity holder 210. In this embodiment, the deformation of the at least one cavity 203 can be caused by the movement of a fastener 209 (not shown). When the fastener 209 puts the load cell in compression or tension the volume in the at least one cavity 203 changes which moves the indicating material 202 in or out of the tube 206. The change in volume of the at least one cavity 203 can be used to measure the direction and magnitude of the applied force.

FIG. 14 is an embodiment of an indicator tube configuration wherein the at least one indicator tube 206 used as the indicator channel has the at least one indicating material 202 inside the at least one indicator tube 206 where the length of the indicating material 202 inside the at least one indicator channel indicates the volumetric change of the at least one cavity 203. The indicating material 202 is connected to the at least one cavity through the at least one indicator hole 205.

Figure 15:
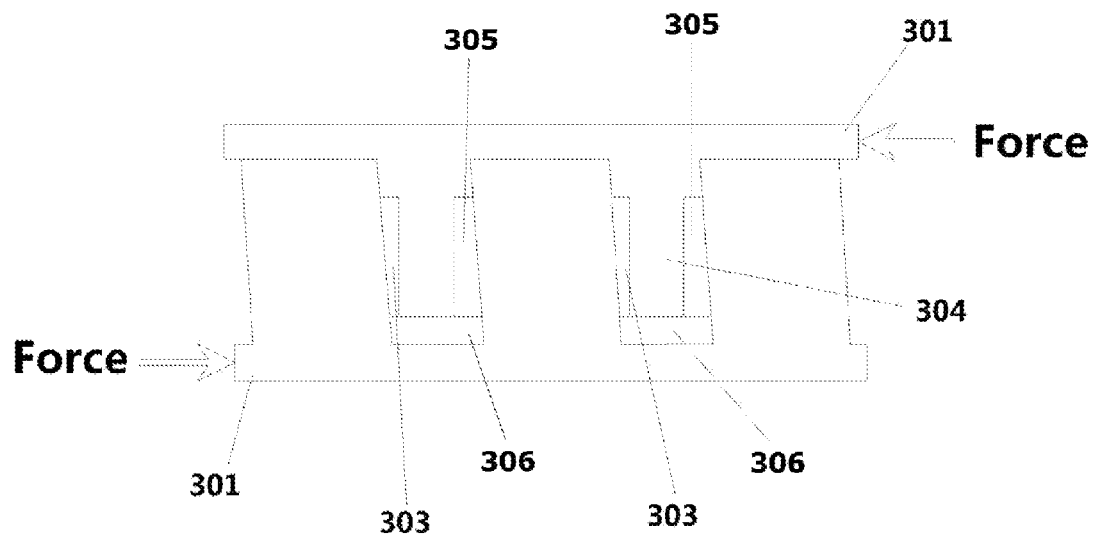
FIG. 15 is a sectional view of another embodiment of the device wherein the device comprises at least two independent cavities.
Figure 16:
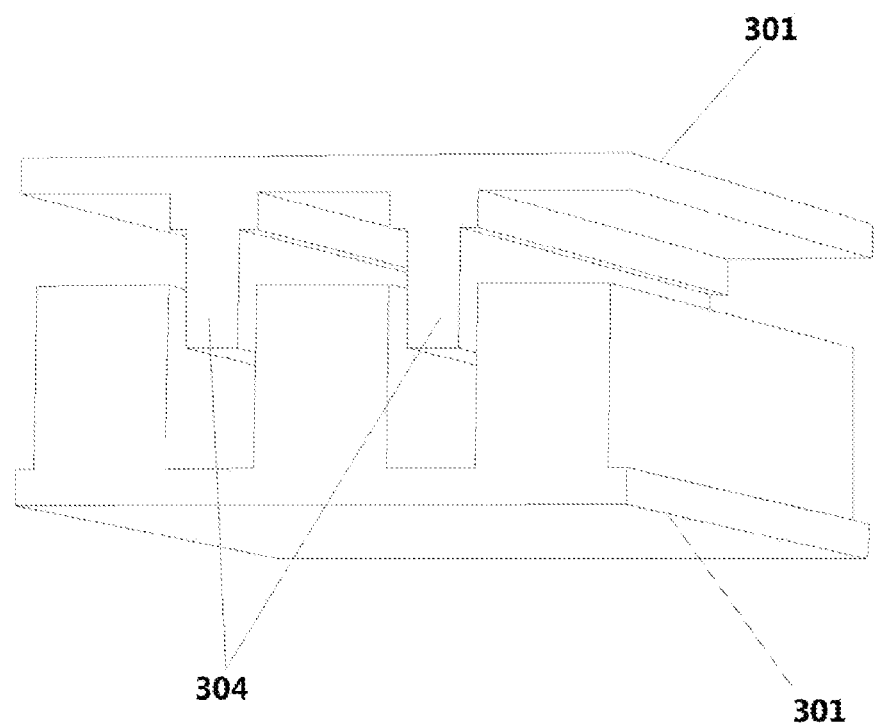
FIG. 16 is an exploded view of the embodiment wherein the device comprises at least two independent cavities.

FIG. 15 and FIG. 16 show another embodiment of the device 100 wherein the force measuring device 100 can comprise at least two independent cavities, at least two load receiving areas, and indicating material. In this embodiment, the volume of the at least two independent cavities 303 and 305 change when force is applied to the at least one load receiving area 301. The indicating material 202 moves in or out of the at least two independent cavities 303 and 305 as their volumes change to indicate the magnitude and/or direction of the applied loads. If the top part 304 moves to the left, the at least one seal 306 keeps the indicating materials in 303 and 305 separated without bending either of the bottom columns 304. This allows the change in cavity 303 volume to be different from the change in cavity 305 volume.

This embodiment is designed to measure force applied to the device by observing the difference between the amount of indicating materials 202 being squeezed out from the at least two independent cavities 303 and 305. In the embodiment shown in FIG. 15, shear forces are applied to the device 100. In order to measure shear forces in this embodiment, the at least one indicating material in the left cavity 303 of the at least two cavities is isolated from the right cavity 305 of the at least two cavities. There can be one indicator tube 206 for the left cavity and one indicator tube 206 for the right cavity. When the at least two cavities are subjected to shear force, the change of volume in the left cavity 303 and right cavity 305 of the at least two independent cavities will be different, therefore there will be different volumes of indicator material 202 moved in each indicator tube 206. Shear forces and compression forces can be therefore measured by observing the amount of indicating material 202 in each of the indicator tubes 206.

Figure 17:
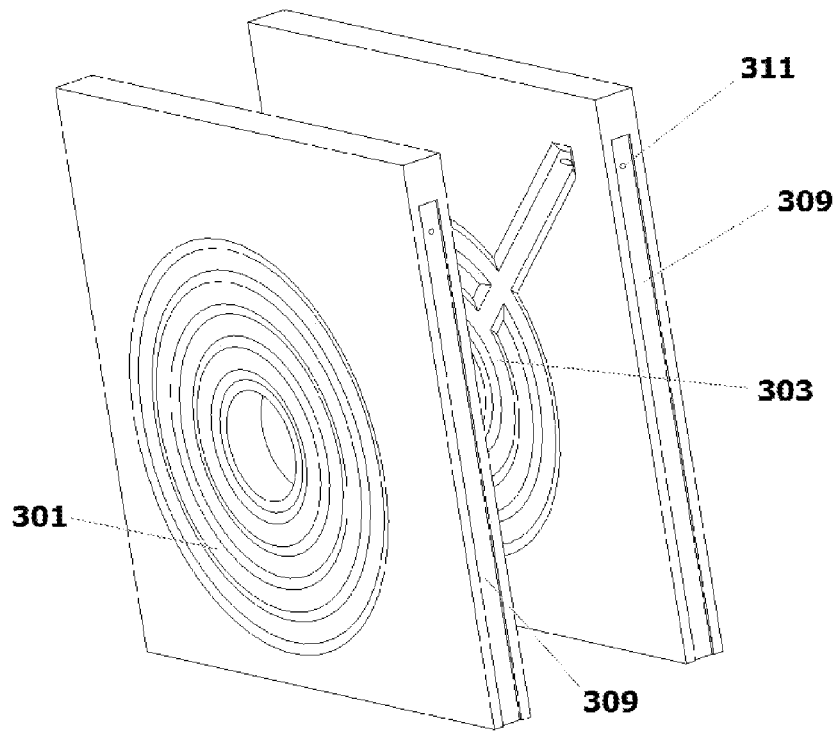
FIG. 17 is an exploded view of another embodiment of the device wherein the at least one cavity is in a ring shape.
Figure 18:
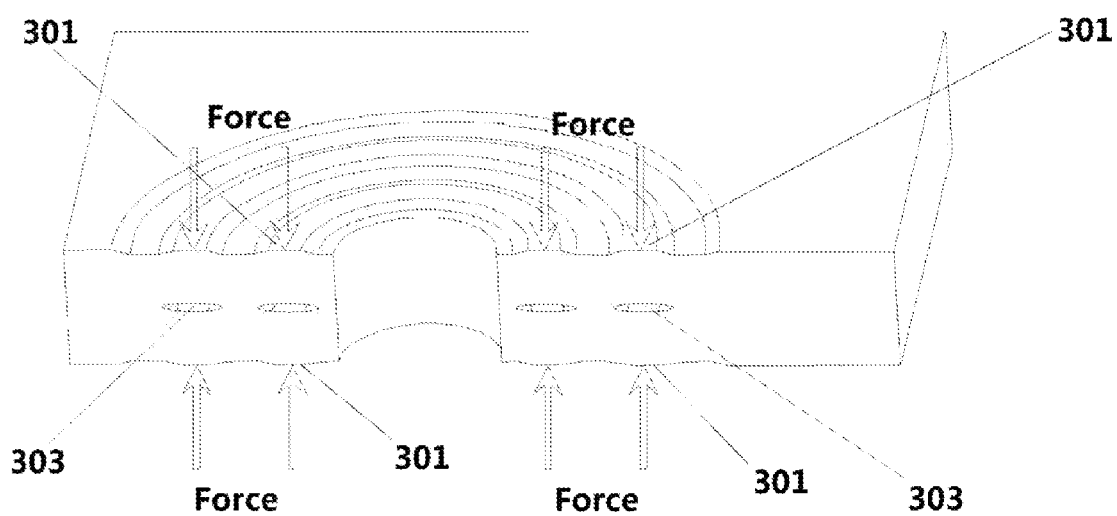
FIG. 18 is a section view of the device wherein the at least one cavity is in a ring shape.

FIG. 17 and FIG. 18 show another embodiment of the device 100 wherein the at least one cavity 303 is in a ring shape. In this embodiment, the design relies on tangential strain, bending, and/or compression of diagonal sections to squeeze indicating material 202 out of its at least one cavity 303 through the at least one indicator hole 311 and into the at least one indicating channel 309 when a force is applied to the at least one load receiving area 301. An advantage of this embodiment is that each ring shaped cavity 303 can be isolated from another ring-shaped cavity 303 and therefore giving separate compression readings for each cavity 303.

Figure 21:
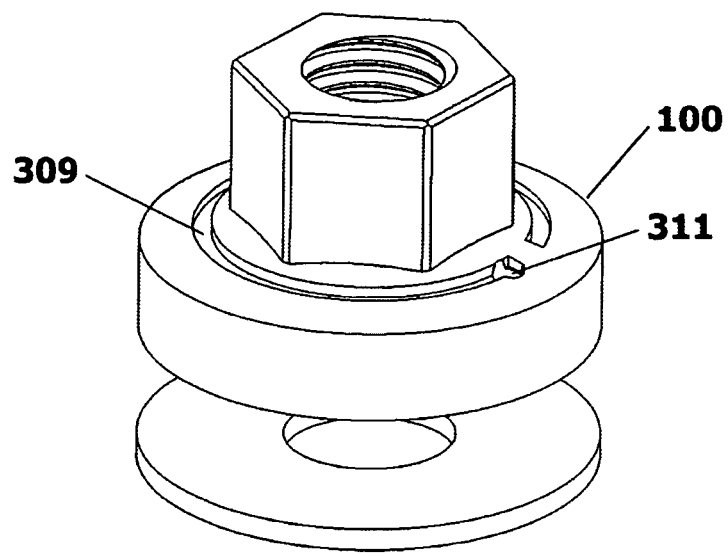
FIG. 21 is another embodiment of the device wherein the at least one indicating channel can be seen on the top of a flange nut.
Figure 22:
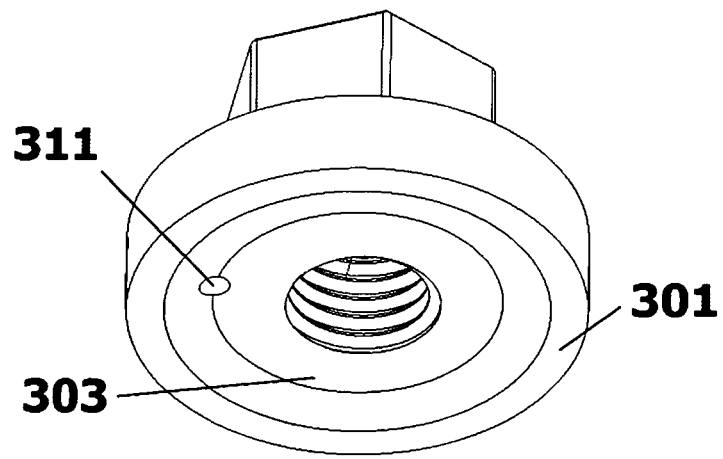
FIG. 22 is an alternate view of the device to more clearly show the at least one cavity on the bottom of a flange nut.
Figure 23:
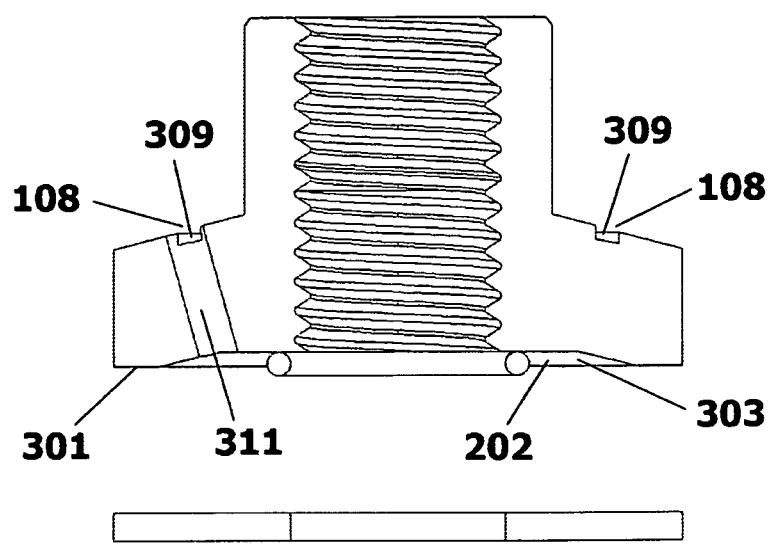
FIG. 23 is a sectional view of the device wherein the at least one cavity is sealed by a ring and bottom washer.

FIG. 21, FIG. 22, and FIG. 23 show another embodiment of the device 100 as a flange nut and washer wherein the at least one cavity 303 is in a ring shape. In this embodiment, the design relies on tangential strain, bending, and/or compression of diagonal sections to squeeze indicating material 202 out of its at least one cavity 303 through the at least one indicator hole 311 and into the at least one indicating channel 309 when a force is applied to the at least one load receiving area 301. The at least one channel cover 108 (the location for the cover is shown, but not the cover itself), is made of transparent or semi-transparent material, covers and seals the at least one indicating channel 309.

Figure 19:
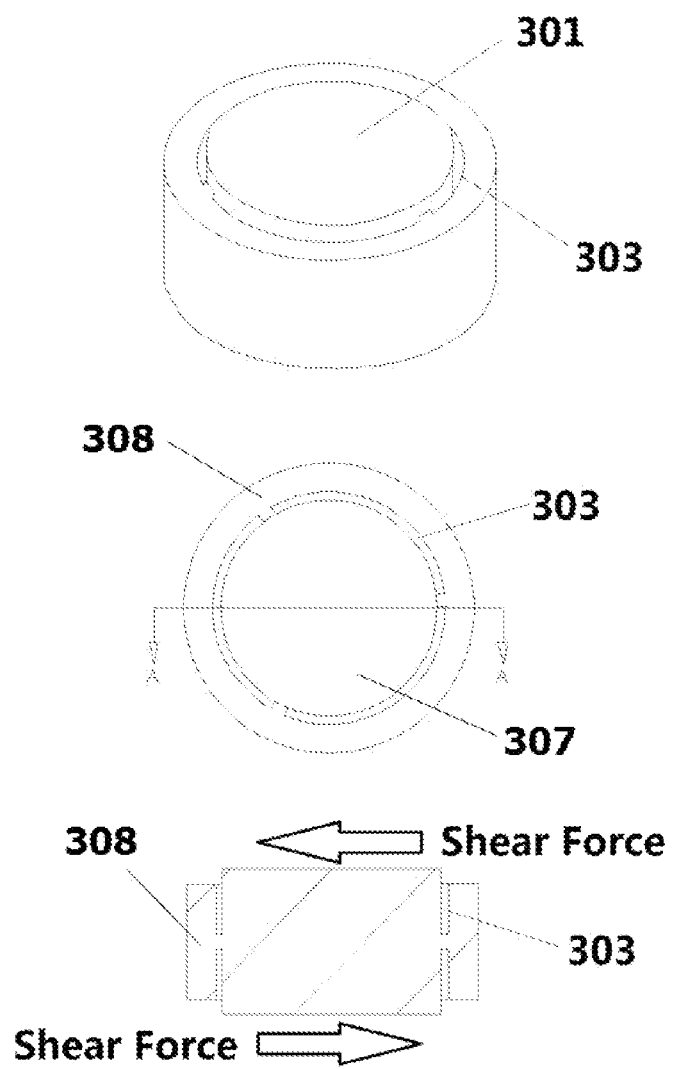
FIG. 19 is another embodiment of the device comprising at least two independent cavities wherein the device is in a cylindrical shape.

FIG. 19 is another embodiment of the device 100 comprising at least two cavities 303 wherein the device is in a cylindrical shape. The device 100 can be used to measure shear force and its direction. In this embodiment, the device 100 can comprise a disk 307 and outer ring 308 to measure shear force magnitude and direction in addition to the compression and/or tension forces.

In one embodiment shown in FIG. 19, the spaces between the inner ring of disc 307 and the outer ring 308 can comprise six cavities for indicating material 202 to move in and out of these cavities. There can be three cavities 303 that are 120 degrees apart in the upper part of the device 100 and three corresponding cavities 303 in the lower part of the device 100. The three pairs of cavities 303 in this configuration allow the magnitude and direction of the shear force to be measured by observing the difference of the amount of indicating materials 202 moved in or out of each individual cavity 303. When the shear forces are applied as seen in the bottom image of the device 100, the indicating material 202 is pressed out of the bottom right cavity 303 and indicating material 202 moves into the upper right cavity 303. This difference in the change in volumes of the cavities can be used to measure the magnitude and direction of the shear force applied along with the magnitude and direction of compression and/or tension forces.

Figure 20:
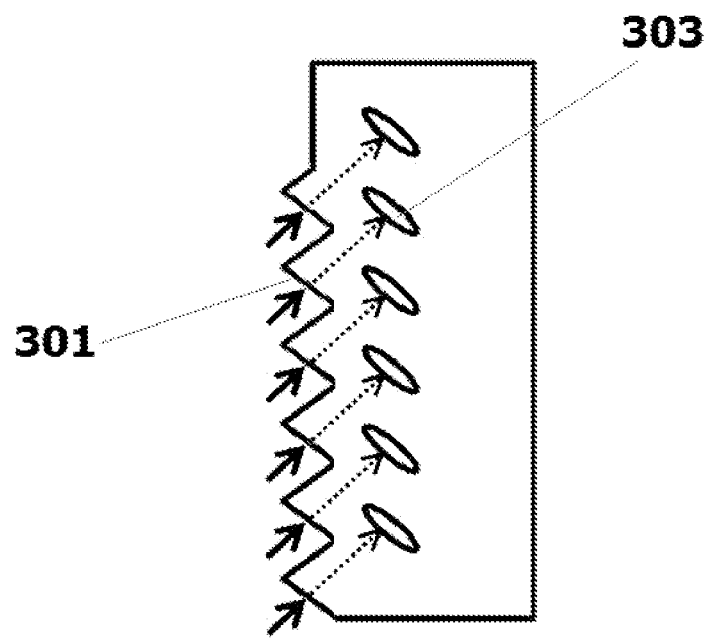
FIG. 20 is another embodiment of the device wherein the at least one cavity is located near the threads of a nut, stud, bolt, etc.

FIG. 20 is another embodiment of the device wherein the at least one cavity 303 is positioned near the at least one thread of a nut, stud, bolt, etc. In this embodiment, the deformation of the at least one cavity 303 can be caused by the movement of the at least one load receiving area 301 when a force is applied as shown by the arrows. This embodiment can also measure the difference in the load between one thread, or one group of threads, and another thread, or group of threads, by using at least two cavities 303 that are independent.

What is claimed is:

1. A reversible force measuring device comprising:
   at least one cavity,
   at least one cavity wall,
   at least one of a fastener component and a load cell component,
   at least one load receiving area, and
   at least one indicating material;
   wherein the at least one cavity is a space defined by the at least one cavity wall,
   wherein applying force to the at least one load receiving area causes a reversible volumetric change of the at least one cavity on the at least one of a fastener component and a load cell component, and wherein the reversible volumetric change of the at least one cavity causes the at least one indicating material to move in or out of the at least one cavity to indicate the magnitude and/or direction of the applied force.

2. A reversible force measuring device as claimed in claim 1, further comprising:
   at least one indicator hole,
   at least one indicator channel, and
   at least one of a channel cover and a tube;
   wherein the at least one indicator hole is connected with the at least one cavity,
   wherein the at least one of a channel cover and a tube is made of transparent or semi-transparent material, and covers and seals the at least one indicator channel,
   wherein the at least one indicating material moves from the at least one cavity through the at least one indicator hole, and into the at least one indicator channel when force is applied to the at least one load receiving area.

3. A reversible force measuring device as claimed in claim 2 further comprising at least one one-way valve to prevent the indicating material from retrieving back into the at least one cavity.

4. A reversible force measuring device as claimed in claim 2, further comprising at least one tube, wherein the at least one tube is disposed inside the at least one cavity to seal the at least one indicating material.

5. A reversible force measuring device as claimed in claim 2, wherein the at least one indicating material can be liquid, gas, or a resilient material.

6. A reversible force measuring device as claimed in claim 2, wherein the at least one indicator channel further comprises material capable of changing its color when this material comes into contact with the at least one indicating material.

7. A reversible force measuring device as claimed in claim 2, wherein the at least one indicating material has properties that allow it to expand or contract with temperature increases or decreases to compensate for the expansion or contraction of the at least one cavity due to the change in temperature of the reversible force measuring device.

8. A reversible force measuring device as claimed in claim 2, further comprising:
   at least one additional cavity,
   wherein this at least one additional cavity changes its volume in response to the change in temperature of the reversible force measuring device.

9. A reversible force measuring device comprising:
   at least one cavity,
   at least one flexible cavity wall,
   at least one fixed cavity wall,
   at least one fastener,
   at least one load receiving area, and
   at least one indicating material;
   wherein the at least one cavity is the space between the at least one flexible cavity wall and the at least one fixed cavity wall, wherein the at least one fixed cavity wall is part of a fixed medium or adjacent to a fixed medium, wherein the at least one fastener causes a reversible volumetric change of the at least one cavity by applying a force to the at least one load receiving area which moves the at least one flexible cavity wall, and wherein the reversible volumetric change of the at least one cavity causes the at least one indicating material to move in or out of the at least one cavity to indicate the magnitude and direction of the force applied by the fastener.

10. A reversible force measuring device as claimed in claim 9, further comprising:
    at least one indicator hole,
    at least one indicator channel, and
    at least one channel cover or tube;
    wherein the at least one channel cover or tube is made of transparent or semi-transparent material, and covers and seals the at least one indicator channel,
    wherein the at least one indicating material moves in and out from the at least one cavity into the at least one indicator channel through the at least one indicator hole when the at least one cavity changes its volume.

11. A reversible force measuring device as claimed in claim 10 further comprising at least one one-way valve to prevent the indicating material from retrieving back into the at least one cavity.

12. A reversible force measuring device as claimed in claim 10, further comprising at least one tube, wherein the at least one tube is disposed inside the at least one cavity to seal the at least one indicating material.

13. A reversible force measuring device as claimed in claim 10, wherein the at least one indicating material can be liquid, gas, or a resilient material.

14. A reversible force measuring device as claimed in claim 10, wherein the at least one indicator channel further comprises material capable of changing its color when this material comes into contact with the at least one indicating material.

15. A reversible force measuring device as claimed in claim 10, wherein the at least one indicating material has properties that allow it to expand or contract with temperature increases or decreases to compensate for the expansion or contraction of the at least one cavity due to the change in temperature of the reversible force measuring device.

16. A reversible force measuring device as claimed in claim 10, further comprising:
    at least one additional cavity,
    wherein this at least one additional cavity changes its volume in response to the change in temperature of the reversible force measuring device.

17. A reversible force measuring device comprising:
    at least two independent cavities,
    at least one of a fastener component and a load cell component,
    at least one load receiving area, and
    at least one indicating material;
    wherein applying force to the at least one load receiving area on the at least one of a fastener component and a load cell component induces independent reversible volumetric changes in each of the at least two independent cavities,
    wherein the reversible volumetric change of each of the at least two independent cavities are different,
    wherein the at least one indicating material moves in or out of the at least two independent cavities as their reversible volumes change to indicate the magnitude and/or direction of the applied force.

18. A reversible force measuring device as claimed in claim 17, wherein each of the at least two independent cavities further comprises:
    at least one indicator hole,
    at least one indicator channel, and
    at least one of a channel cover and a tube;
    wherein the at least one of a channel cover and a tube is made of transparent or semi-transparent material, and covers and seals the at least one indicator channel,
    wherein the at least one indicating material moves in or out from each of the at least two independent cavities, through the at least one indicator hole, and into the at least one indicator channel when force is applied to the at least one load receiving area.

19. A reversible force measuring device as claimed in claim 18, further comprising at least one one-way valve to prevent the at least one indicating material from retrieving back into the at least one cavity.

20. A reversible force measuring device as claimed in claim 18, further comprising at least one tube, wherein the at least one tube is disposed inside the at least one cavity to seal the at least one indicating material.

21. A reversible force measuring device as claimed in claim 18, wherein the at least one indicating material can be liquid, gas, or a resilient material.

22. A reversible force measuring device as claimed in claim 18, wherein the at least one indicator channel further comprises material capable of changing its color when this material comes into contact with the at least one indicating material.

23. A reversible force measuring device as claimed in claim 18, wherein the at least one indicating material has properties that allow it to expand or contract with temperature increases or decreases to compensate for the expansion or contraction of the at least two cavities due to the change in temperature of the reversible force measuring device.

24. A reversible force measuring device as claimed in claim 18, further comprising:
    at least one additional cavity,
    wherein this at least one additional cavity changes its volume in response to the change in temperature of the reversible force measuring device.

25. A reversible force measuring device comprising:
    at least one cavity,
    at least one cavity wall, at least one of a fastener component and a load cell component, at least one load receiving area, and at least one indicating material;

wherein the at least one cavity is a space defined by the at least one cavity wall, wherein applying force to the at least one load receiving area induces a Poisson effect on the at least one cavity wall, wherein the Poisson effect causes a reversible volumetric change of the at least one cavity on the at least one of a fastener component and a load cell component, and wherein the reversible volumetric change of the at least one cavity causes the at least one indicating material to move in or out of the at least one cavity to indicate the magnitude and/or direction of the applied force.

26. A reversible force measuring device as claimed in claim 25, further comprising:

at least one indicator hole, at least one indicator channel, and at least one of a channel cover and a tube;

wherein the at least one indicator hole is connected with the at least one cavity, wherein the at least one of a channel cover and a tube is made of transparent or semi-transparent material, and covers and seals the at least one indicator channel, wherein the at least one indicating material moves from the at least one cavity, through the at least one indicator hole, and into the at least one indicator channel when force is applied to the at least one load receiving area.

27. A reversible force measuring device as claimed in claim 26 further comprising at least one one-way valve to prevent the indicating material from retrieving back into the at least one cavity.

28. A reversible force measuring device as claimed in claim 26, further comprising at least one tube, wherein the at least one tube is disposed inside the at least one cavity to seal the at least one indicating material.

29. A reversible force measuring device as claimed in claim 26, wherein the at least one indicating material can be liquid, gas, or a resilient material.

30. A reversible force measuring device as claimed in claim 26, further comprising:

at least one additional cavity, wherein this at least one additional cavity changes its volume in response to the change in temperature of the reversible force measuring device.

* * * * *